United States Patent
Fukita et al.

[11] Patent Number: 5,835,124
[45] Date of Patent: Nov. 10, 1998

[54] DYNAMIC-PRESSURE GAS BEARING STRUCTURE AND OPTICAL DEFLECTION SCANNING APPARATUS

[75] Inventors: Taku Fukita, Susono; Mikio Nakasugi, Tama; Isshin Sato, Numazu; Tetsuya Katayama, Amagasaki; Osamu Komura, Osaka; Kaoru Murabe, Nishinomiya, all of Japan

[73] Assignees: Canon Kabushiki Kaisha, Tokyo; Sumitomo Electric Industries, Ltd., Osaka, both of Japan

[21] Appl. No.: 716,093

[22] Filed: Sep. 19, 1996

[51] Int. Cl.⁶ ............................ G01D 11/02
[52] U.S. Cl. ................ 347/260; 347/259; 310/90; 310/90.5
[58] Field of Search ............... 347/259, 260, 347/134, 243, 257; 310/90, 90.5

[56] References Cited

U.S. PATENT DOCUMENTS

| | | | |
|---|---|---|---|
| 4,552,417 | 11/1985 | Yamashita et al. | 310/90 |
| 5,019,738 | 5/1991 | Weilbach et al. | 310/90.5 |
| 5,270,737 | 12/1993 | Nakasugi et al. | 346/108 |
| 5,289,067 | 2/1994 | Tanaka et al. | 310/90.5 |
| 5,315,196 | 5/1994 | Yoshida et al. | 310/90 |
| 5,357,272 | 10/1994 | Watanabe et al. | 346/108 |
| 5,532,729 | 7/1996 | Nakasugi | 347/260 |

FOREIGN PATENT DOCUMENTS

| | | |
|---|---|---|
| 515687 | 12/1992 | European Pat. Off. . |
| 528274 | 2/1993 | European Pat. Off. . |
| 58-163818 | 9/1983 | Japan . |
| 1-7849 | 3/1989 | Japan . |
| 2231372 | 11/1990 | United Kingdom . |

*Primary Examiner*—N. Le
*Assistant Examiner*—Hai C. Pham
*Attorney, Agent, or Firm*—Fitzpatrick, Cella, Harper & Scinto

[57] ABSTRACT

A dynamic-pressure gas bearing structure includes a sleeve, a column-like shaft fitted to the sleeve, and a plurality of shallow grooves formed on the outer peripheral surface of the shaft and extending in the axial direction of the shaft. The shallow grooves are formed by grinding in which grains are aligned to the aforementioned axial direction. An optical deflection scanning apparatus is provided with such dynamic-pressure gas bearing structure.

15 Claims, 3 Drawing Sheets

DYNAMIC-PRESSURE GAS BEARING STRUCTURE AND OPTICAL DEFLECTION SCANNING APPARATUS

BACKGROUND OF THE INVENTION

1. Field of the Invention

This invention relates to a dynamic-pressure gas bearing structure in the rotatively driving portion of an optical deflection scanning apparatus for use in an image forming apparatus such as a laser beam printer or a laser facsimile apparatus.

2. Related Background Art

FIG. 1 and 2 of the accompanying drawings show a dynamic-pressure bearing device described in Japanese Utility Model Publication No. 1-7849, FIG. 1 being a cross-sectional view of the dynamic-pressure bearing device in a direction perpendicular to the axial direction thereof, and FIG. 2 being a perspective view of the dynamic-pressure gas bearing device of FIG. 1. A shaft member 62, as shown in FIGS. 1 and 2, has axial shallow grooves 63 in the cylindrical surface thereof. The shallow grooves 63 perform the same function as that of the herringbone-like shallow grooves of an ordinary dynamic-pressure air bearing, and when a bearing 61 and the shaft member 62 rotate relative to each other, dynamic-pressure by the shallow grooves 63 is created between the bearing 61 and the shaft member 62 and uniform air film is formed to thereby hold the two in a non-contact fashion.

The shallow grooves 63 are disposed at circumferentially equal intervals on the surface of the shaft member 62, and the groove working of the shallow grooves 63 is effected by machining.

However, when the material of the shaft member 62 is a ceramic material such as silicon nitride of high strength, it is difficult to form dynamic-pressure producing grooves by ordinary machining such as milling.

SUMMARY OF THE INVENTION

Therefore, it is the object of the present invention to make the machining of the outer peripheral surface of the shaft of a rotatively driving portion easy and improve the performance as a bearing in realizing a dynamic-pressure gas bearing structure stably rotatable at high speed and an optical deflection scanning apparatus provided with the same.

To achieve the above object, the dynamic-pressure gas bearing structure of the present invention has a sleeve and a column-like shaft fitted to the sleeve, and is characterized in that the shaft is formed with a plurality of shallow grooves extending in the axial direction thereof, and the shallow grooves are formed by grinding in which grains are adjusted to the axial direction.

The shaft may preferably be made of a ceramic material.

Since the shallow grooves are formed by grinding in which grains are adjusted to the axial direction of the shaft, the ridgelines of the shallow grooves in the axial direction are in the form of straight lines.

When the dynamic-pressure gas bearing structure of the present invention is used in an optical deflection scanning apparatus and a rotatable polygon mirror is mounted on the sleeve and rotated thereon, even if during the starting of the rotatable polygon mirror or during the deceleration stoppage thereof or during the low-speed rotation thereof, dynamic-pressure becomes insufficient and therefore the rotatable sleeve comes into the fixed shaft, it may not happen that as in a case where the opposite side edges of each shallow groove are concavo-convex ridgelines, point contact occurs between the rotatable sleeve and the fixed shaft to thereby produce abrasion powder or cause a trouble such as the galling of the bearing.

That is, there can be realized an optical deflection scanning apparatus of high performance in which even when the rotatable polygon mirror is rotated at low speed, stable bearing performance is maintained and the rotatable polygon mirror may not cause bad rotation or the reflecting surface or the like of the rotatable polygon mirror may not be contaminated by abrasion powder.

DESCRIPTION OF THE PREFERRED EMBODIMENT

An embodiment of the present invention will hereinafter be described with reference to the drawings.

Figure 3A:
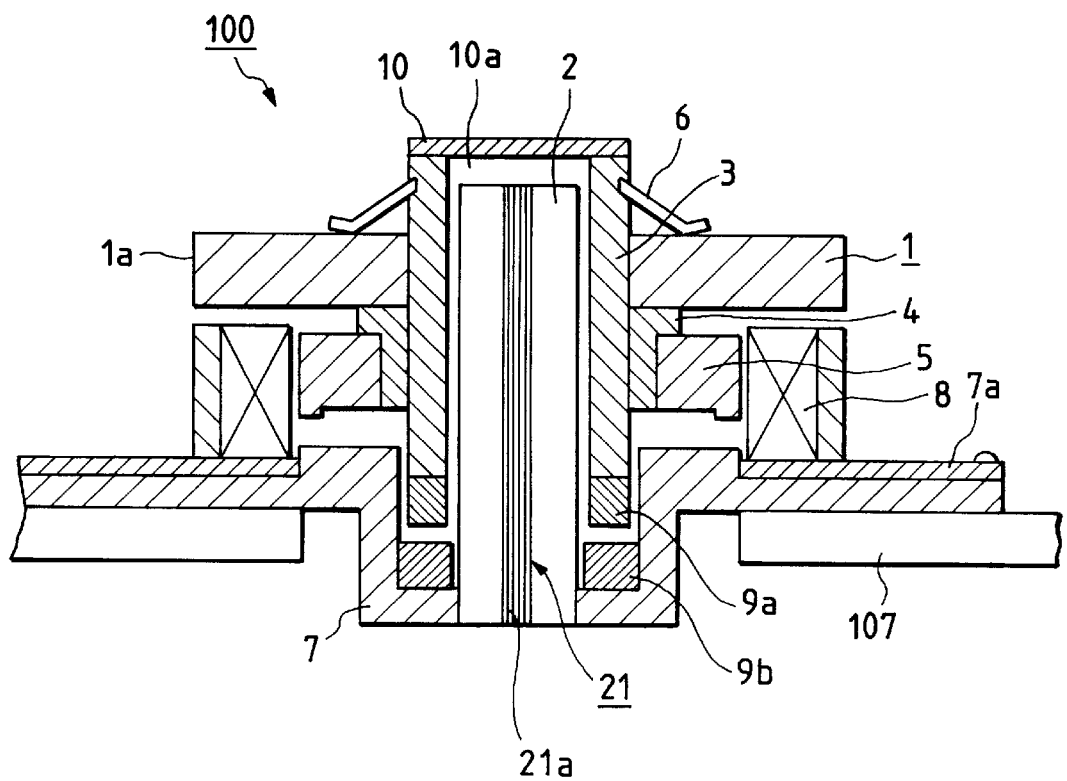
FIGS. 3A and 3B show an optical deflection scanning device provided with a dynamic-pressure gas bearing structure according to an embodiment of the present invention, FIG. 3A being a schematic cross-sectional view thereof, and FIG. 3B being an enlarged perspective view showing only a fixed shaft on an enlarged scale.

FIG. 3A is a schematic cross-sectional view showing the rotatively driving portion of an optical deflection scanning apparatus provided with a dynamic-pressure gas bearing structure according to an embodiment of the present invention. This has a rotatable polygon mirror 1 provided with a reflecting surface 1a on the outer peripheral surface thereof, and the driving portion thereof comprises a rotatable sleeve 3 fitted to a column-like fixed shaft 2, a rotor magnet 5 secured to a flange member 4 provided integrally with the rotatable sleeve, the rotatable polygon mirror 1 being urged against the flange member 4 by a press spring 6, a motor base plate 7a supported by a motor housing 7 to which the fixed shaft 2 is fixed, and a stator coil 8 provided upright on the motor base plate, and the stator coil 8 constitute drive means together with the rotor magnet 5, and by the stator coil 8 being excited, the rotor magnet 5 and the rotatable polygon mirror 1 are rotated as a unit.

Figure 3B:
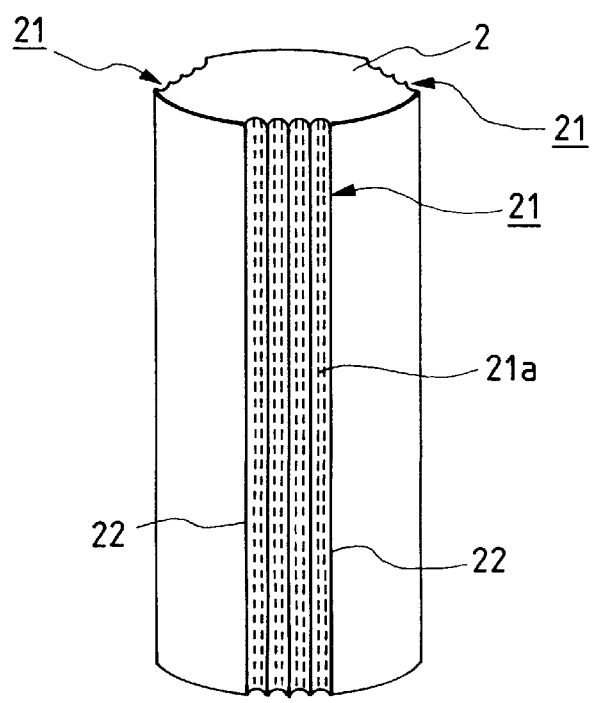
Figure 5:
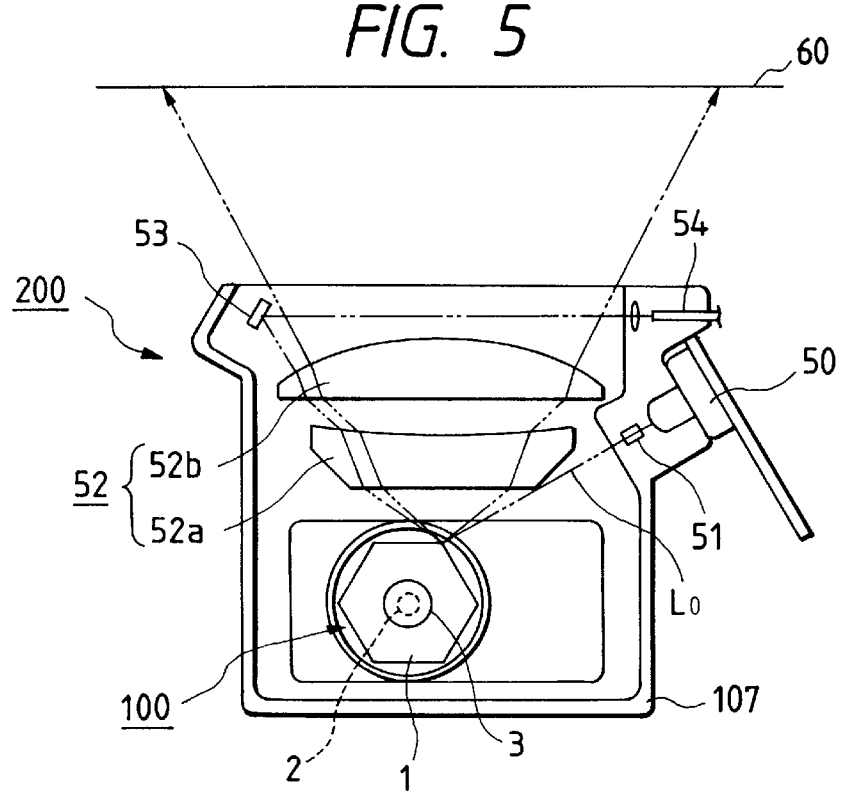
FIG. 5 illustrates an optical deflection scanning apparatus used in an image forming apparatus such as a laser beam printer or a laser facsimile apparatus provided with the dynamic-pressure gas bearing structure of the present invention.

The rotatively driving portion shown in FIGS. 3A and 3B is incorporated into a laser beam printer apparatus using an optical deflection scanning apparatus shown in FIG. 5.

The rotatable sleeve 3 forms air film between it and the fixed shaft 2 by its rotation, and constitute a dynamic-pressure gas bearing structure rotatable in non-contact with the fixed shaft 2. A first permanent magnet 9a is secured to the lower end of the rotatable sleeve 3, and the lower surface of the first permanent magnet 9a is opposed to the upper surface of a second permanent magnet 9b fixed to the motor housing 7. Thereby, a drive motor 100 for rotating the rotatable sleeve 3 is constituted.

The upper end opening in the rotatable sleeve 3 is closed by a lid member 10, and an air pool 10a is formed between the upper end of the fixed shaft 2 and the lid member 10. When the axial position of the rotatable sleeve 3 relative to the fixed shaft 2 changes, the air in the air pool 10a is pressurized or reduced in pressure and a force which tries to return the rotatable sleeve 3 to its original position works and serves to reliably prevent the axial displacement of the rotatable polygon mirror 1 together with the magnetic repulsion by the first and second permanent magnets 9a and 9b.

The fixed shaft 2 and the rotatable sleeve 3 are made of a ceramic material such as silicon nitride ($Si_3N_4$) of high strength to reduce the galling by the friction between the two or the entry of dust, and the flange member 4 is made of a metal such as aluminum or brass and is secured to the rotatable sleeve 3 by shrinkage fitting, and the end surface of the rotor magnet 5 is made to bear against the lower surface of the flange portion of the flange member 4, and is adhesively secured to the flange member 4 by an adhesive agent interposed between the outer peripheral surface of the cylindrical portion of the flange member 4 and the inner peripheral surface of the rotor magnet 5.

The lid member 10 is made of a metal such as aluminum or stainless steel, or resin, and is secured to the upper end of the rotatable sleeve 3 by a conventional method such as adhesion.

Shallow grooves 21 for creating dynamic-pressure between the outer peripheral surface (cylindrical surface) of the fixed shaft 2 and the rotatable sleeve 3 are axially formed in the outer peripheral surface (cylindrical surface) of the fixed shaft 2. The shallow grooves 21 are disposed at three locations at circumferentially equal intervals in the peripheral surface of the fixed shaft 2, and the groove working of the shallow grooves 21 is effected by repetitively moving a grinding wheel for groove working in the axial direction of the fixed shaft 2 while intermittently rotating the fixed shaft 2. Accordingly, the grains 21a of the shallow grooves 21 are formed in the axial direction, and straight ridgelines 22 formed on the opposite side edges of each shallow groove 21 are in the form of straight lines free of unevenness along the grains 21a.

Figure 4:
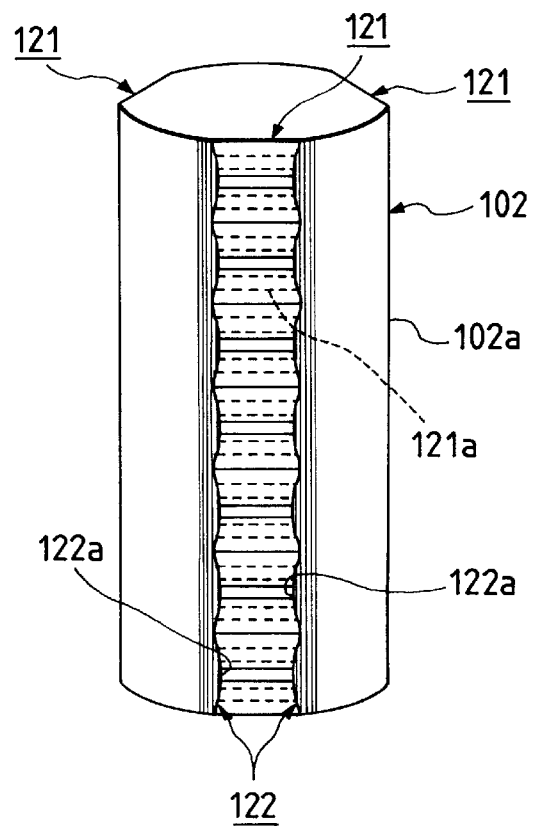
FIG. 4 is an enlarged perspective view showing only the fixed shaft on an enlarged scale when grains are ground in the circumferential direction thereof.

FIG. 4 is an enlarged. perspective view showing on an enlarged scale the fixed shaft of a dynamic-pressure gas bearing structure ground with the grains adjusted to the circumferential direction, for comparison with the present embodiment.

The fixed shaft 102 and a rotatable sleeve (not shown) fitted to this fixed shaft 102 are made of a ceramic material such as silicon nitride ($Si_3N_4$) of high strength to reduce the galling or the like due to the friction between the two or the entry of dust or the like, and the fixed shaft 102, as shown in FIG. 4, has axial shallow grooves 121 in the cylindrical surface thereof. The shallow grooves 121 performs the same function as that of the herringbone-like shallow grooves of an ordinary dynamic-pressure air bearing, and when the rotatable sleeve is rotated, dynamic-pressure by the shallow grooves 121 is created between the rotatable sleeve and the fixed shaft 102 and uniform air film is formed and holds the two in a non-contact fashion.

The shallow grooves 121 are disposed at three locations at circumferentially equal intervals in the surface of the fixed shaft 102, and the groove working of each shallow groove 121 is effecting by cutting off a portion of the surface 102a of the fixed shaft 102 axially thereof into a band-like shape by a grinding wheel. Accordingly, each shallow groove 121 is substantially constituted by an axial single flat surface formed in a band-like shape on the cylindrical surface 102a of the fixed shaft 102.

In order to provide shallow grooves on a shaft made of a ceramic material such as silicon nitride ($Si_3N_4$) of high strength, employed as in the present embodiment, cutting of a predetermined depth is made to the shaft by rotating a grinding wheel in which diamond abrasive grains are fixed by resinoid bonds, and the shaft is moved relatively to the grinding wheel in the axial direction to thereby effect a band-like grinding in the axial direction. Thus, a predetermined shape is formed on the shaft.

However, when as in the above-described comparative example, the grains of the shallow grooves formed in the surface of the fixed shaft are not axial, there arises a problem that the surface of the fixed shaft is abraded around the shallow grooves and a great deal of abrasion powder is produced and is liable to contaminate a rotatable polygon mirror or the like mounted on the rotatable sleeve or cause a trouble such as bad rotation due to the galling of the bearing. The reason is as follows.

If the grains of the shallow grooves are, for example, axial, the ridgelines 122 formed on the opposite sides of each shallow groove 121 assume a saw-tooth-like concavo-convex shape, as shown in FIG. 4.

During the staring or during the deceleration stoppage or the low-speed rotation of the rotatable polygon mirror mounted on the rotatable sleeve, dynamic-pressure is not sufficiently created in the air film between the rotatable sleeve and the fixed shaft 102 and accordingly, the rotatable sleeve comes to rotate while locally contacting with the fixed shaft 102, but when the rotatable sleeve thus rotates while contacting with the fixed shaft 102, so-called point-contact takes place when the rotatable sleeve contacts with the convex portions 122a of the ridgelines 122 of the shallow grooves 121 of the fixed shaft 102, and the contact pressure increases locally remarkably and abrades these portions. As a result, a great deal of abrasion powder is produced and contaminates the interior of the optical deflection scanning apparatus or induces bad rotation due to the galling or the like of the bearing.

In contrast, in the present embodiment, during the starting or during the deceleration stoppage or the low-speed rotation of the rotatable polygon mirror 1, sufficient dynamic-pressure is not created in the air film between the rotatable sleeve 3 and the fixed shaft 2 and accordingly, the rotatable sleeve 3 comes to rotate while locally contacting with the fixed shaft 2, but the ridgelines 22 of each shallow groove 21 are in the form of straight lines axially free of unevenness and therefore, there is no possibility that as in the above-described comparative example, contact pressure locally increases and causes the production of abrasion powder or induces the galling or the like of the bearing.

That is, the ridgelines 22 of the shallow grooves 21 are in the form of axially extending straight lines and are not of a concavo-convex shape as in the above-described comparative example and therefore, when the fixed shaft is contacted by the rotatable sleeve 3, the contact is so-called line-contact in which the whole of the ridgelines 22 uniformly contacts with the rotatable sleeve 3, and there is no possibility that like the concavo-convex ridgelines, contact pressure locally increases due to point-contact.

According to the present embodiment, there can be realized an optical deflection scanning apparatus of very high performance in which during the starting or during the deceleration stoppage or the low-speed rotation of the rotatable polygon mirror, the bearing portion supporting the rotatable polygon mirror is prevented from a great deal of abrasion powder or the bad rotation due to a trouble such as the galling of the bearing or the like is prevented from being induced and stable optical performance is maintained not only during the high-speed rotation but also during the starting or the low-speed rotation of the rotatable polygon mirror.

While the present embodiment is one in which both of the fixed shaft and the rotatable speed are made of a ceramic material, only one of the fixed shaft and the rotatable sleeve may be made of a ceramic material and the other may be made of a metal or resin, or both of the fixed shaft and the rotatable sleeve may be made of a metal or resin.

A drive motor 100 shown in FIGS. 3A and 3B is incorporated in the optical box 107 of an optical deflection scanning apparatus 200 as shown in FIG. 5.

FIG. 5 illustrates an optical deflection scanning apparatus used in an image forming apparatus such as a laser beam printer or a laser facsimile apparatus provided with the dynamic-pressure gas bearing structure of the present invention, and this apparatus causes a laser beam $L_0$ produced from a light source unit 50 to be linearly condensed on the reflecting surface of the rotatable polygon mirror 1 by a cylindrical lens 51, and be deflected and scanned by the rotation of the rotatable polygon mirror 1 and imaged on a photosensitive member 60 which is a recording medium on a rotatable drum via an imaging lens system 52. The imaging lens system 52 is comprised of a spherical lens 52*a*, a toric lens 52*b*, etc. and has the function of correcting the distortion of a point image formed on the photosensitive member. Also, a part of the laser beam deflectively scanned is introduced into the light receiving end of an optical fiber 54 by a reflecting mirror 53, is converted into a scanning start signal and is sent to the light source unit 50.

A driving portion for the rotatable polygon mirror 1 comprises a rotor magnet secured to the rotatable sleeve 3 fitted t o the fixed shaft 2, through the flange member 4, the rotatable polygon mirror 1 being integrally coupled to the flange member 4, and a motor base plate supported o n a motor housing fixed to the fixed shaft 2, and a stator coil provided upright on the motor base plate is excited to thereby rotate the rotor magnet and the rotatable polygon mirror 1 as a unit.

The present invention is constructed as described above and therefore achieves the following effects.

It can be avoided for the dynamic-pressure gas bearing having dynamic-pressure creating grooves comprising axial shallow grooves to be locally abraded during the starting or during the deceleration stoppage or the low-speed rotation of the rotatable polygon mirror to thereby produce a great deal of powder or cause a trouble such as bad rotation. That is, there can be realized an optical deflection scanning apparatus of high performance in which even when the rotatable polygon mirror is rotated at low speed, stable bearing performance is maintained and there is not the possibility of the rotatable polygon mirror causing bad rotation or the reflecting surface thereof being contaminated by powder or the like produced by the abrasion of the bearing.

Also, the dynamic-pressure gas bearing structure of the present invention is applied to the rotatively driving portion of the optical deflection scanning apparatus rotated at high speed and with high accuracy, whereby there can be provided a laser beam printer apparatus which is high in quality of printing and capable of printing at high speed, as compared with the prior art.

What is claimed is:

1. A dynamic-pressure gas bearing structure comprising:

a sleeve;

a column-like shaft fitted to said sleeve; and a plurality of shallow grooves formed on the outer peripheral surface of said shaft and extending in the axial direction of said shaft, said shallow grooves being formed by grinding wherein grains of said shallow grooves are aligned with said axial direction.

2. A dynamic-pressure gas bearing structure according to claim 1, wherein said sleeve is a rotatable sleeve, and said shaft is a fixed shaft.

3. A dynamic-pressure gas bearing structure according to claim 1, wherein said shaft is made of a ceramic material.

4. A bearing rotating apparatus comprising:

a sleeve;

a column-like shaft fitted to said sleeve;

a plurality of shallow grooves formed on the outer peripheral surface of said shaft and extending in an axial direction of said shaft, said shallow grooves being formed by grinding wherein grains of said shallow grooves are aligned with said axial direction; and drive means for rotating said sleeve with respect to said shaft.

5. A bearing rotating apparatus according to claim 4, wherein said sleeve is a rotatable sleeve, and said shaft is a fixed shaft.

6. A bearing rotating apparatus according to claim 4, wherein said shaft is made of a ceramic material.

7. An optical deflection scanning apparatus for deflectively scanning a light beam, comprising:

a sleeve;

a column-like shaft fitted to said sleeve;

a plurality of shallow grooves formed on the outer peripheral surface of said shaft and extending in an axial direction of said shaft, said shallow grooves being formed by grinding wherein grains of said shallow grooves are aligned with said axial direction;

drive means for rotating said sleeve with respect to said shaft; and a deflector mounted on one of said sleeve and said shaft for deflectively scanning a light beam.

8. An optical deflection scanning apparatus according to claim 7, wherein said sleeve is a rotatable sleeve, said deflector is mounted on said sleeve, and said shaft is a fixed shaft.

9. An optical deflection scanning apparatus according to claim 7, wherein said shaft is made of a ceramic material.

10. An optical deflection scanning apparatus for deflectively scanning a light beam from a light source, comprising:

a sleeve;

a column-like shaft fitted to said sleeve;

a plurality of shallow grooves formed on the outer peripheral surface of said shaft and extending in an axial direction of said shaft, said shallow grooves being formed by grinding wherein grains of said shallow grooves are aligned with said axial direction;

drive means for rotating said sleeve with respect to said shaft;

a light source; and a deflector mounted on one of said sleeve and said shaft for deflectively scanning a light beam from said light source.

11. An optical deflection scanning apparatus according to claim 10, wherein said sleeve is a rotatable sleeve, said deflector is mounted on said sleeve, and said shaft is a fixed shaft.

12. An optical deflection scanning apparatus according to claim 10, wherein said shaft is made of a ceramic material.

13. A laser beam printer apparatus comprising:

a sleeve;

a column-like shaft fitted to said sleeve;

a plurality of shallow grooves formed on the outer peripheral surface of said shaft and extending in an axial direction of said shaft, said shallow grooves being formed by grinding wherein grains of said shallow grooves are aligned with said axial direction;

drive means for rotating said sleeve with respect to said shaft;

a light source;

a deflector mounted on one of said sleeve and said shaft for deflectively scanning a light beam from said light source; and a photosensitive member for receiving the light beam, deflectively scanned by said deflector.

14. A laser beam printer according to claim 13, wherein said sleeve is a rotatable sleeve, said deflector is mounted on said sleeve, and said shaft is a fixed shaft.

15. A laser beam printer according to claim 13, wherein said shaft is made of a ceramic material.

\* \* \* \* \*

UNITED STATES PATENT AND TRADEMARK OFFICE
CERTIFICATE OF CORRECTION

PATENT NO. : 5,835,124

DATED : November 10, 1998

INVENTOR(S) : Taku FUKITA, et al.

Page 1 of 2

It is certified that error appears in the above-identified patent and that said Letters Patent is hereby corrected as shown below:

ON THE COVER PAGE:

As a separate field, insert:

--[30] Foreign Application Priority Data
    Sep. 19, 1995 [JP] Japan ... 7-265037
    Sep. 18, 1996 [JP] Japan ... 8-267766--.

Figure 1:
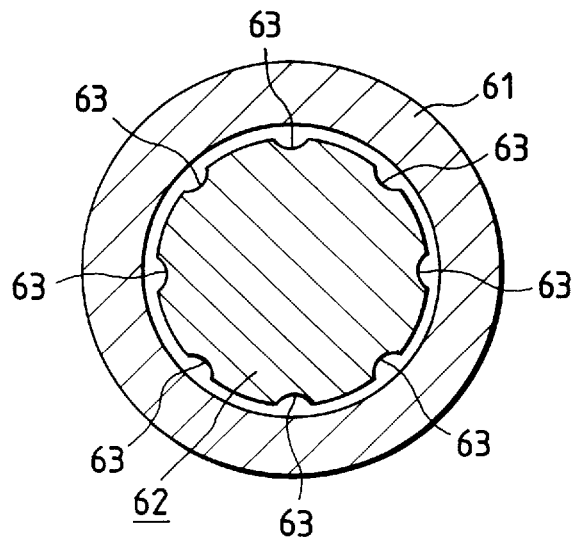
FIGS. 1 and 2 show a dynamic-pressure gas bearing device according to the prior art.
Figure 2:
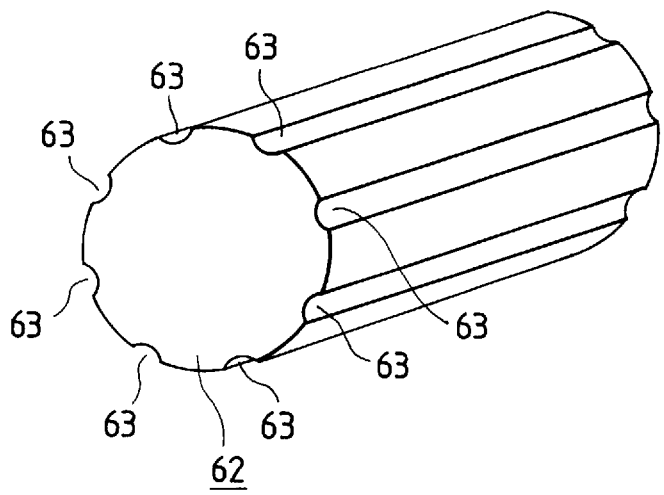

COLUMN 1:

Line 14, "FIG.1" should read --FIGS. 1--.

UNITED STATES PATENT AND TRADEMARK OFFICE
CERTIFICATE OF CORRECTION

PATENT NO. : 5,835,124

DATED : November 10, 1998

INVENTOR(S) : Taku FUKITA, et al.

It is certified that error appears in the above-identified patent and that said Letters Patent is hereby corrected as shown below:

COLUMN 2:

Line 50, "constitute" should read --constitutes--; and
    Line 58, "constitute" should read --constitutes--.

COLUMN 3:

Line 41, "enlarged." should read --enlarged--;
    Line 52, "performs" should read --perform--; and
    Line 62, "effecting" should read --effected--.

COLUMN 4:

Line 23, "staring" should read --starting--.

COLUMN 5:

Line 35, "t o" should read --to--; and
    Line 37, "o n" should read --on--.

Signed and Sealed this

Seventeenth Day of August, 1999

Attest:

Q. TODD DICKINSON

*Attesting Officer*      Acting Commissioner of Patents and Trademarks